(12) United States Patent
Chen et al.

(10) Patent No.: US 7,337,147 B2
(45) Date of Patent: Feb. 26, 2008

(54) DYNAMIC DIGITAL CONTENT LICENSING

(75) Inventors: Ling Tony Chen, Bellevue, WA (US); Shyam Krishnamoorthy, Kirkland, WA (US); Daniel M. C. Caiafa, Redmond, WA (US); Jerry Paul Hook, Everett, WA (US); Dan E. Walther, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 11/172,227

(22) Filed: Jun. 30, 2005

(65) Prior Publication Data
US 2007/0005504 A1    Jan. 4, 2007

(51) Int. Cl.
*H04K 1/00* (2006.01)
*H04L 9/00* (2006.01)

(52) U.S. Cl. .............................. 705/59; 705/51; 726/7; 726/17; 726/19

(58) Field of Classification Search .................. 705/51, 705/59
See application file for complete search history.

(56) References Cited

U.S. PATENT DOCUMENTS

| | | | |
|---|---|---|---|
| 5,765,152 A * | 6/1998 | Erickson | 707/9 |
| 5,924,094 A * | 7/1999 | Sutter | 707/10 |
| 6,389,403 B1 * | 5/2002 | Dorak, Jr. | 705/52 |
| 2002/0065781 A1 * | 5/2002 | Hillegass et al. | 705/59 |
| 2004/0205028 A1 * | 10/2004 | Verosub et al. | 705/59 |
| 2005/0071280 A1 * | 3/2005 | Irwin et al. | 705/59 |
| 2005/0091164 A1 * | 4/2005 | Varble | 705/52 |
| 2005/0091268 A1 * | 4/2005 | Meyer et al. | 707/103 R |
| 2005/0216415 A1 * | 9/2005 | Stefik et al. | 705/51 |

* cited by examiner

*Primary Examiner*—Calvin L. Hewitt, II
*Assistant Examiner*—Nancy T. Le
(74) *Attorney, Agent, or Firm*—Workman Nydegger

(57) ABSTRACT

Various techniques are described for managing license rights for a variety of digital content. One technique involves initiating a request for a specific content package. The content package includes a unique content package identifier that can be linked with a license offer that also has a unique identifier. A determination is made as to whether the specific content package is available locally, and if not, the specific content package is downloaded. A use license can be obtained for digital content contained within the specific content package. One or more use-license parameters can be determined based on the use license obtained for the digital content. Finally, use of the digital content is enabled in accord with the license parameters that were thus determined.

9 Claims, 9 Drawing Sheets

DYNAMIC DIGITAL CONTENT LICENSING

BACKGROUND

Presently, one issue of central importance for content providers is the management of copyright for works licensed to end users. Digital rights management (DRM) is an emerging field with the goal of providing management regimes for the protection of copyright on digital content, such as digitally encoded music and films, as well as computer programs and computer program components. Due to the nature of digital works, content in a digital form can often be duplicated with relative ease unless the content is managed through various technical forms of use-restriction.

Systems currently used for managing digital content typically employ hardware-based solutions to prevent unauthorized duplication or access. One such technique can be implemented with key codes programmed into a memory location in firmware. For example, a key code may be included in a nonvolatile memory format such as a flash card upon which a program, such as a game, is stored. The key code stored on the memory allows a user to access a program, such as a game, when the memory is inserted into a device that can read the key code. In this manner, a use license is implemented for the game each time the memory is inserted into a game console, and copying, as well as unauthorized use or access, can be prevented. Thus a user can be granted a restricted use license for a game at the time of purchase, and the restricted use license travels with the game on a memory storage device on which the game is stored. However, many programs and games are available for purchase electronically online, and therefore hardware-based content-management is either not applicable, or simply impractical to implement. Furthermore, at present, there is a desire among both content providers and consumers to provide greater portability for access rights related to digital content than has been possible using currently available methodologies. This problem is evident, for example, when trying to control digital rights in regard to software that is accessed at a central online site by a licensed user using a different computing device than was employed when the license to the software was originally acquired by the user. The user will want to freely access the software, but the online central site must be able to determine that the user is licensed to do so. Accordingly, effective solutions for the management of digital content use-rights are likely to be in high demand in coming years, as digital media becomes the standard format for information exchange.

SUMMARY

This Summary is provided to introduce a selection of concepts in a simplified form that are further described below in the Description. The Summary is not intended to identify key features or essential features of the claimed subject matter, nor is it intended to be used as an aid in determining the scope of the claimed subject matter.

As explained in greater detail below, various techniques are described for managing license rights for a variety of digital content. One such technique involves initiating a request for a specific content package. The content package includes a unique content package identifier that can be linked with a license offer that also has a unique identifier. In the technique, it is determined whether the specific content package is available locally, and if not, the specific content package is downloaded. A use license can be obtained for digital content contained within the specific content package.

One or more use-license parameters can be determined based on the use license obtained for the digital content. Finally, use of the digital content is enabled in accord with the license parameters that were previously determined.

Another aspect is directed to a memory medium that stores machine instructions for detecting a license request from a computer system for authenticated digital content. The request includes a computing system identifier, a digital content identifier, and a user identifier. The memory media also includes machine instructions for matching the user identifier with a user account record responsive to detecting the license request. The user account record includes a primary computing system identifier that is associated with the user identifier, and also a transaction history. The transaction history includes a record of each license granted to the user identifier that relates to the authenticated digital content. Each license of the record also includes a unique license identifier. The memory media further includes machine instructions for determining all licenses for the authenticated digital content, based on the user account record, and for providing a license data structure to the computing system. The license data structure provided to the computing system includes one or more content access flags based on the user account record.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Exemplary Gaming and Media System

Figure 1:
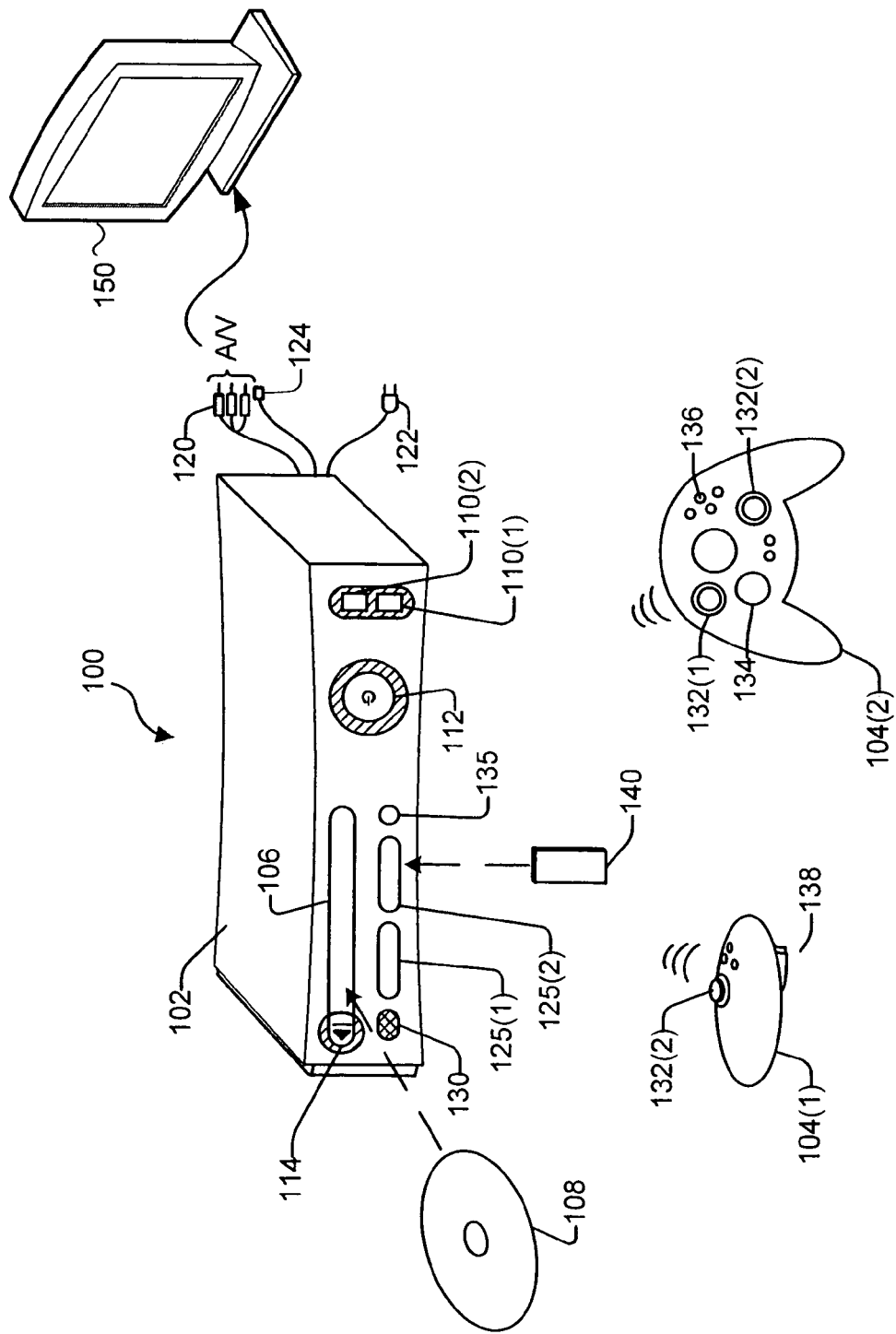
FIG. 1 is an isometric view of an exemplary gaming system with which at least one embodiment of digital content licensing can be employed.

FIG. 1 shows an exemplary gaming and media system 100. The following discussion of this Figure is intended to provide a brief, general description of a suitable environment in which certain methods may be implemented. As shown in FIG. 1, gaming and media system 100 includes a game and media console (hereinafter "console") 102. In general console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (not shown) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation (not shown), a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, or from MU 140. A sample of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

Functional Details of Exemplary Gaming and Media System

Figure 2:
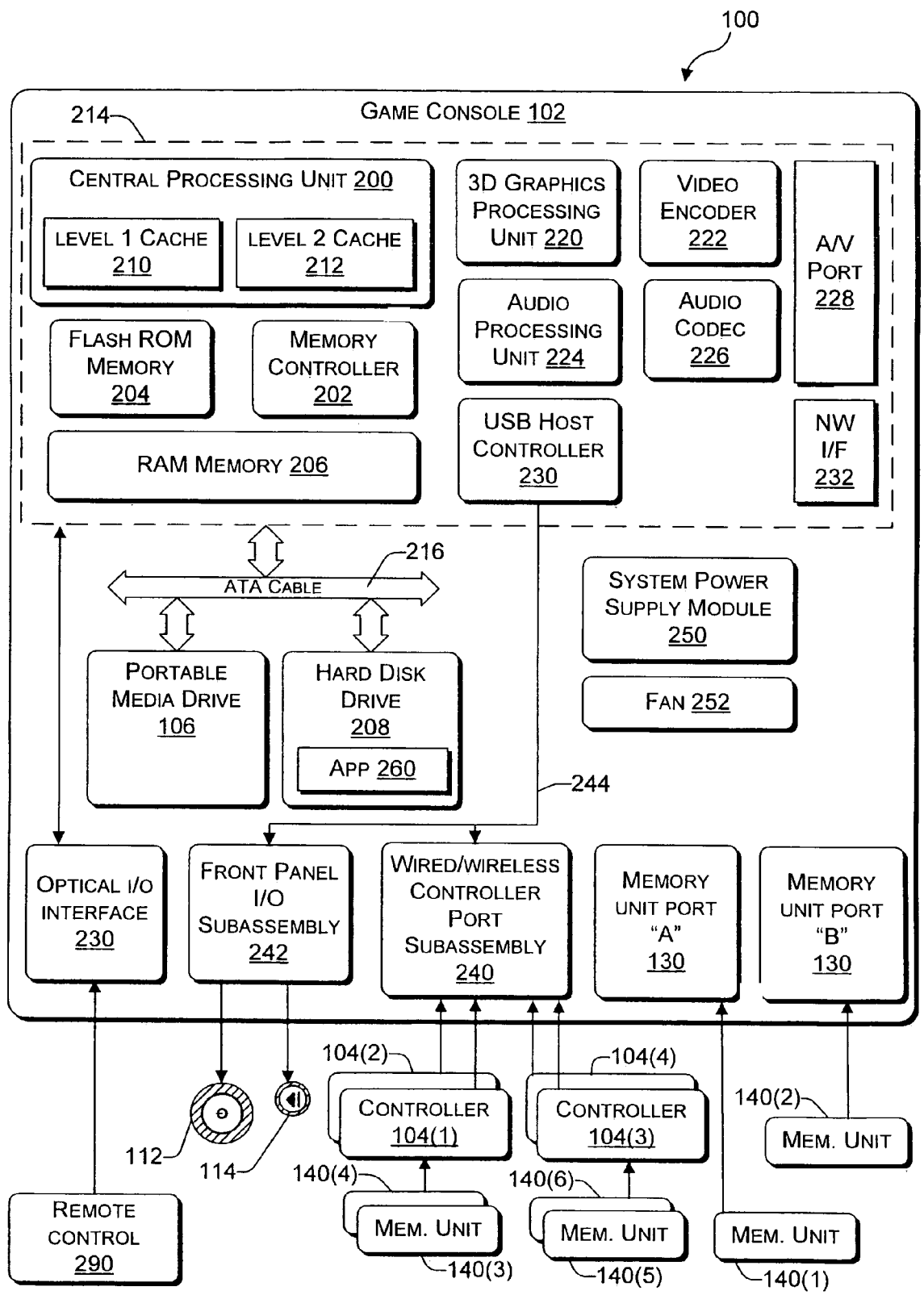
FIG. 2 is an exemplary functional block diagram of a gaming system like that shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a Bluetooth module, a cable modem, and the like.

In the implementation depicted in FIG. 2, console 102 includes a controller support subassembly 240, for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

To implement one or more method steps, an application 260 comprising machine instructions is stored on hard disk drive 208. When console 102 is powered on, various portions of application 260 are loaded into RAM 206, and/or caches 210 and 212, for execution on CPU 200. Application 260 is described below in more detail.

Gaming system 100 may be operated as a standalone system by simply connecting the system to monitor 150 (FIG. 1), a television, a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participant in a larger network gaming community, as discussed below in connection with FIG. 4.

Exemplary Computing System

Figure 3:
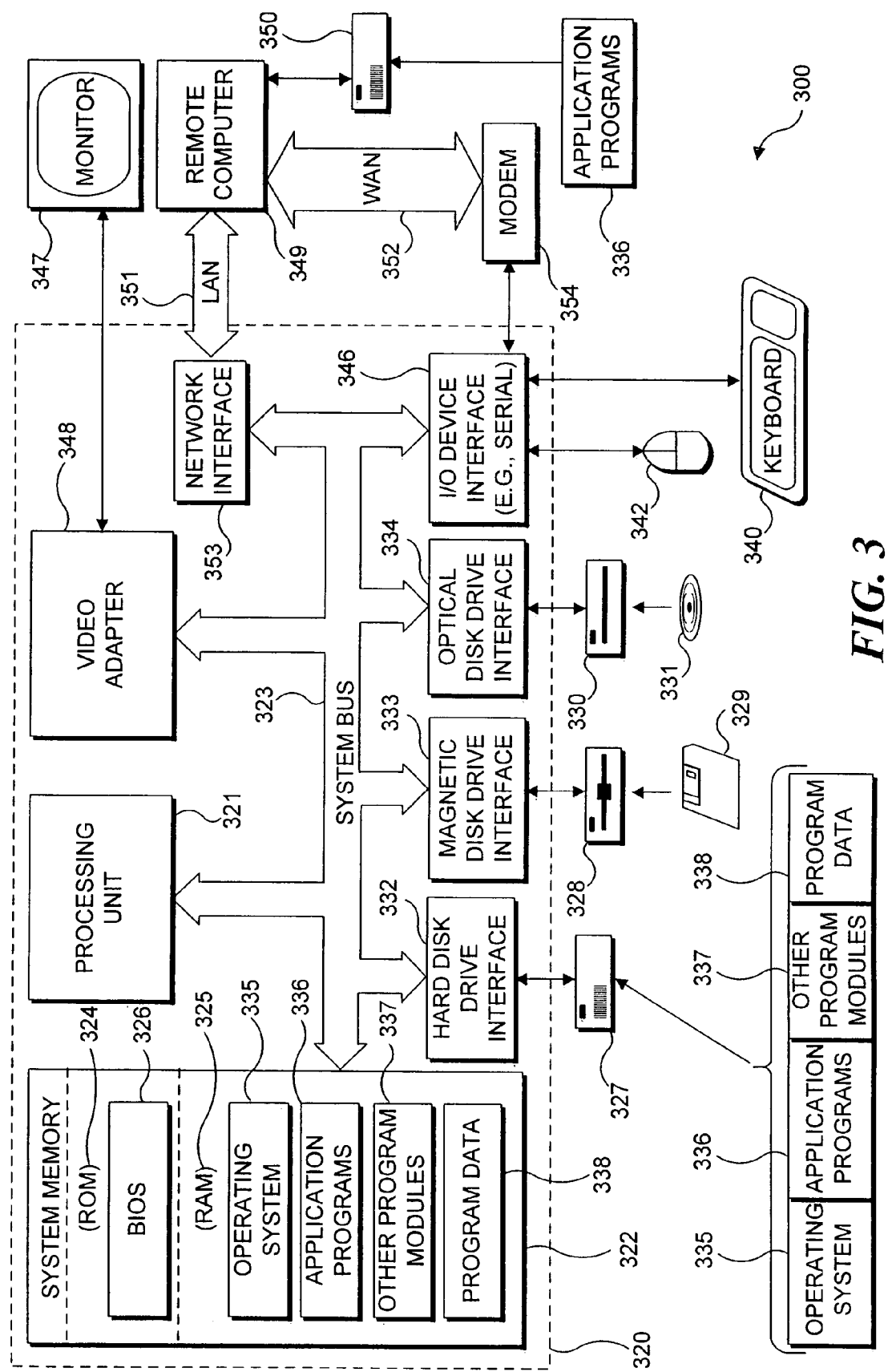
FIG. 3 is a functional block diagram of an exemplary computing system, which is useful for serving up software in connection with dynamic digital content licensing.

FIG. 3 is a functional block diagram of an exemplary computing system that is usable as a client for playing digital content, and/or as a server for serving digital media to the computing device of connected clients, such as gaming system 100 or a similar computing system. The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc. that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 3, an exemplary computing system 300 is shown having a general purpose computing device 320 that further includes a processing unit 321, a system memory 322, and a system bus 323 that couples various system components, including system memory 322, to processing unit 321. System bus 323 may be any of several types of bus structures including a memory bus or memory controller, a peripheral bus, and a local bus using any of a variety of bus architectures. The system memory includes ROM 324 and RAM 325.

A basic input/output system (BIOS) 326 of fundamental routines that enable the transfer of information between elements within personal computer 320, such as during start-up, is stored in ROM 324. Personal computer 320 further includes mass storage including a hard disk drive 327, a magnetic disk drive 328 for use with a removable magnetic disk 329, and an optical disk drive 330 for reading from or writing to a removable optical disk 331 such as a CD ROM or other optical media. Hard disk drive 327, magnetic disk drive 328, and optical disk drive 330 are coupled to system bus 323 via a hard disk drive interface 332, a magnetic disk drive interface 333, and an optical disk drive interface 334, respectively. The drives 327, 328, and 330 and their associated computer-readable media provide nonvolatile storage of computer readable instructions, data structures, program modules, and other data for personal computer 320. Although the exemplary environment described herein employs a hard disk, a removable magnetic disk 329, and a removable optical disk 331, other types of computer readable media, such as for example, magnetic cassettes, flash memory cards, digital video disks, Bernoulli cartridges, RAMs, ROMs, may also be used in the exemplary operating environment.

A number of program modules can be stored on the hard disk, magnetic disk 329, optical disk 331, ROM 324 or RAM 325, including an operating system 335, one or more application programs 336, other program modules 337, and program data 338. A user may enter commands and information into personal computer 320 through input devices such as a keyboard 340 and pointing device 342. Other input devices (not shown) may include a microphone, joystick, game controller, satellite dish, scanner, or the like. These and other input devices can be connected to processing unit 321 through a serial port interface 346 that is coupled to the system bus, but can also be connected by other interfaces, such as a parallel port, game port, an IEEE 1394-compliant port, a universal serial bus (USB) or any of a variety of ports compliant with one of several adopted wireless standards (e.g., Bluetooth, IEEE 802.xx, etc). A monitor 347 or other type of display device is also connected to system bus 323 via an interface, such as a video adapter 348. In addition to the monitor, computers can also include other peripheral output devices (not shown), such as speakers and printers.

Computer 320 may operate in a networked environment using logical connections to one or more remote computers, such as a remote computer 349. Remote computer 349 may be personal computer, a server, a router, a network PC, a peer device or other common network node, and can include many or all of the elements described above relative to personal computer 320, although only a remote memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, computer 320 is connected to local network 351 through a network interface or adapter 353. When used in a WAN networking environment, computer 320 typically includes a modem 354 or other means for establishing communications over WAN 352, such as the Internet. Modem 354, which may be internal or external, is connected to system bus 323 via serial port interface 346. In one implementation, computer 320 is a server computer operating in a networked environment, and program modules depicted relative to computer 320, or portions thereof, can be stored in the remote memory storage device 350.

Exemplary Operating Environment

Figure 4:
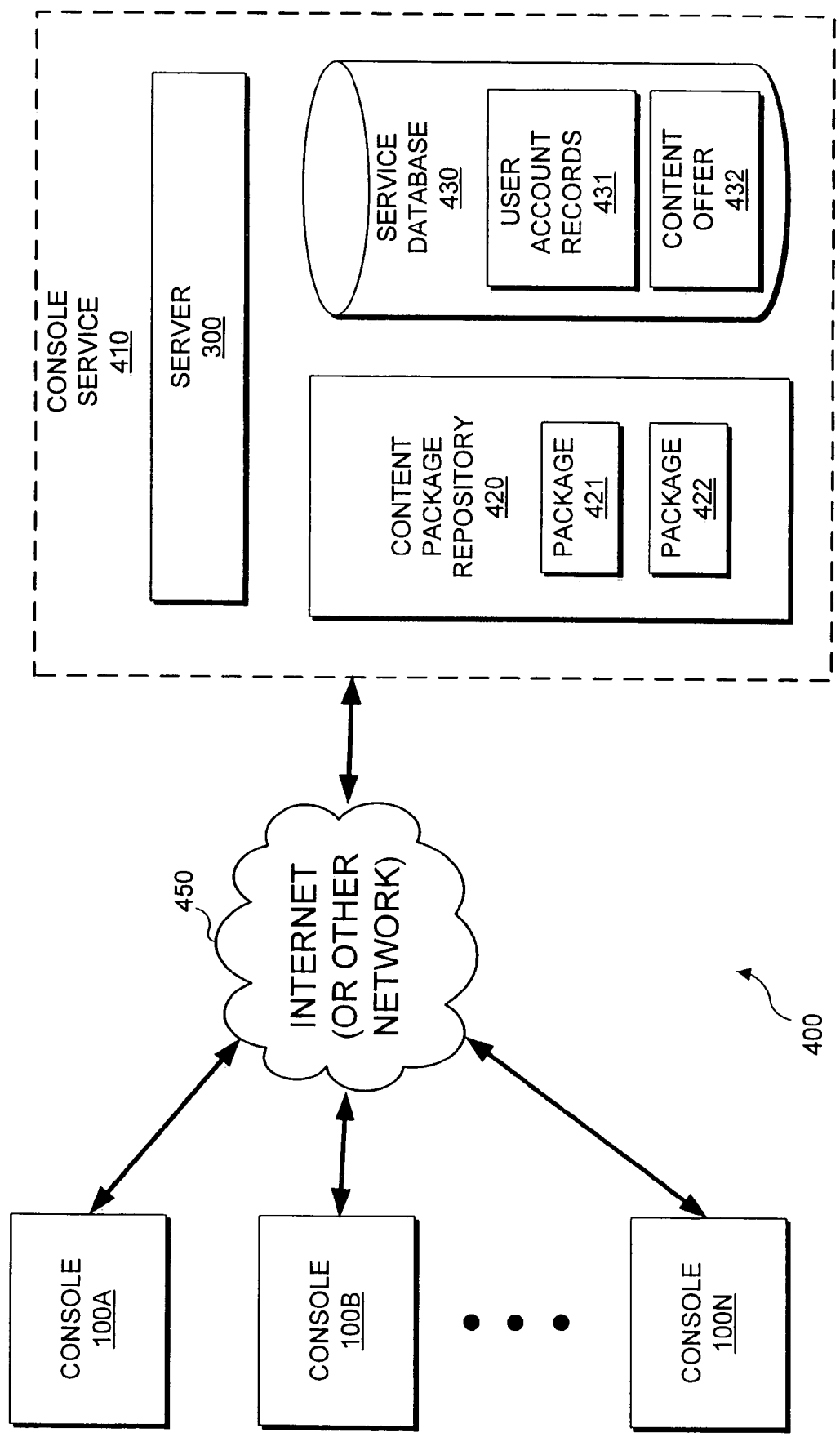
FIG. 4 is a functional block diagram of an exemplary operating environment for a system for dynamically managing user licenses for digital content.

FIG. 4 is a block diagram of an exemplary operating environment for various methods for dynamically managing user licenses of digital content. FIG. 4 shows a console service 410 in communication with a plurality of consoles (100A-100N) via communication system 450. Console service 410 further includes a server computing system 300, a content package repository 410, and a console service database 430. Content package repository 420 has a plurality of digital content packages, illustrated in FIG. 4 by way of example, as content packages 421 and 422. Console service database 430 is shown as including a user account record 431 and a content offer 432.

In one implementation, each of the plurality of consoles (e.g., each of consoles 100A-100N) is a gaming and media system, such as game and media system 100 of FIGS. 1 and 2. In another implementation, each of consoles 100A-100N is a computing system, such as computing system 300 of FIG. 3. In general, consoles 100A-100N can be a selection of electronic devices enabled for communication with console service 410. In another implementation, server 300 of console service 410 is a computing system such as computing system 300 of FIG. 3. Generally, any console of the above-described variety can be configured for on-line and off-line use, such that all users of an off-line console can access licensed software stored in memory on the console to execute or play the licensed software, for example. Furthermore, since a console is generally a device that can be configured to accept a MU, licensed software can be ported from one console to another for use by a licensed user using a MU or other appropriate memory device.

Communication system 450 can be any communication system configured to communicate signals between consoles 100A-100N and console service 410. In one implementation, communication system 450 is configured as a virtual private network (VPN) that utilizes a secure protocol (e.g., secure socket layer "SSL") to communicate encrypted information through the Internet between consoles 100A-100N and console service 410. In another application, communication system 450 is implemented with calls to dedicated application program interfaces (APIs) using a secure communication protocol that enables closed-network communication between the consoles 100A-100N and the console service 410.

In general, console service 410 is any combination of one or more server-side devices and applications configured to facilitate digital content use-license management. In one implementation, console service 410 includes a server 300, a content package repository 420 and a console service database 430, all in communication with each other. In one implementation (not shown), console service 410 can be configured to implement encryption and/or authentication using a public key infrastructure (e.g., certification authority) in order to digitally sign data packages, such as content and license packages with a private key. Console service 410 can include additional components that are not relevant to the present discussion, which are therefore omitted from the Figure for clarity.

Service data base 430 can include one or more relational databases stored in one or more data storage devices (not separately shown in this Figure) at one or more locations. Service database 430 includes a plurality or data records including user account record 431 and a content offer 432. User account record 431 can include a variety of information related to each specific user identifier (ID), such as associated unique identification code or key. The user account record thus associates information related to the user identifier with other information, such as a primary console identifier, i.e., a unique machine identifier code for a specific console that is most often used with the user ID. The user account record 431 can also include information such as a transaction history that includes a record of each license granted to a user ID for various authenticated digital content, expiration periods for licensed content when applicable, and a tally of purchased micro-payment units and other information tied to a specific subscription-based user account. In yet another implementation, user account record 431 can contain information such as user preferences or selections that can be applied to filter new content offers and other data. Content offer 432 is a bundle of rights that can be linked with specific digital content, such as a game, game component, or a media file, by reference to a specific digital content identifier. Content offer 432 can be a promotional offer, such as a limited trial-basis license that grants access to a limited feature set of an application or media file, or can be an unlimited license granted for both use and duplication, e.g., on either a single console or computing device, or on all consoles and/or computing devices. In one implementation, content offer 432 can be expressed in a table of permissions (not shown) at console service 400, which can be linked to a user account record (e.g., user account record 431) or a content package (e.g., packages 421 and 422), as a series of permission bits, with the permissions granted based on a purchase by a user or an offer. In other implementations, content offer 432 can grant a license, limited or unlimited, for a specific time period. In this case, an activation code can be used to determine when the time period begins to run for the license.

Content package repository 420 can include one or more data storage and processing systems (not shown) that are implemented to store and retrieve digital data packages (e.g., data packages 421 and 422). In one implementation, content package repository 420 is a distributed data storage system that includes one or more databases located in one or more locations, which can be in communication via a communication system (none shown). In another implementation, content package repository 420 is a component of a so-called "server farm." In general, content repository 420 catalogues and stores digital content, such as executable programs including games, and/or other digital content, such as new game levels, game components and digital media files for movies, music, and other digital media. In one implementation, content package repository stores a plurality of encapsulated executable programs (e.g., packages 421 and 422) indexed for quick access and parallel download by a plurality of consoles, such as any of consoles 100A-100N. In some implementations, each distinct content package stored in content package repository 420 has a unique ID. In one implementation, the unique ID can include a data structure that includes product ID codes and access permission bits that can be toggled appropriately, based on a license grant. In other implementations, a security code or hash value can be included to provide a basis for integrity checks and content control of a content package delivered to a console or other computing device. In one embodiment, a one-way hash of the content can be determined and used to produce a content "digest" that may be used for security checks. For example, the digest can be appended to a license package and signed with a private key (usable with a public key infrastructure) in order to lock the license to the specific content.

Exemplary Method for Managing License Rights in Digital Media

Figure 5:
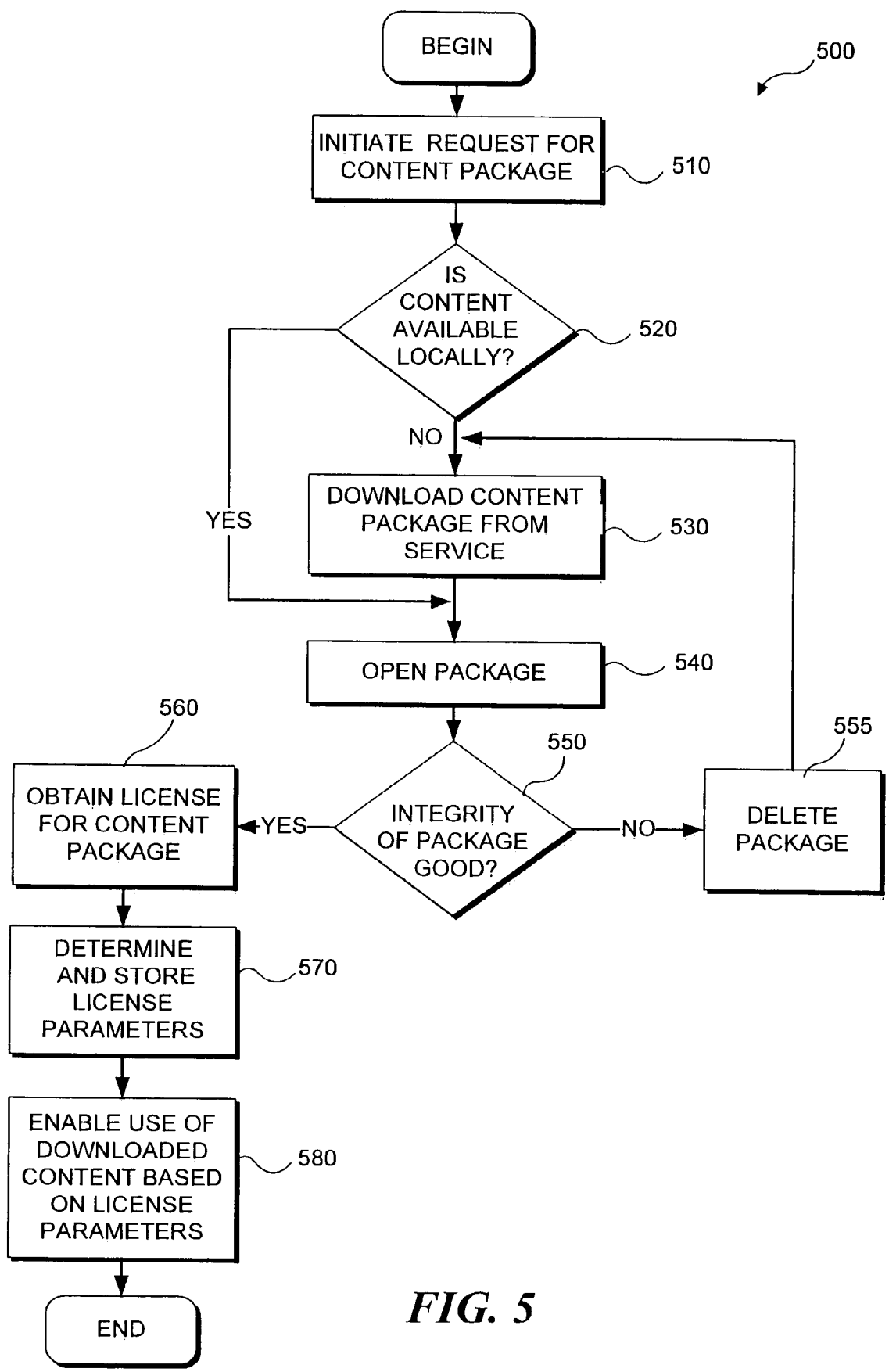
FIG. 5 is a flow diagram illustrating the steps of an exemplary method.

FIG. 5 is a flow diagram illustrating an exemplary method 500 for managing content license rights for digital content usable with a computing system. Method 500 can be implemented in some embodiments with components, devices, and techniques as discussed with reference to FIGS. 1-4. In some implementations, one or more steps of method 500 are embodied on a computer readable medium containing computer readable code such that a series of steps are implemented when the computer readable code is executed on a computing device, such as a microprocessor. In the following description, various steps of the method 500 are described with respect to a processor of a console in a gaming and media system that is performing the method steps, in communication (as appropriate) with a server that provides the digital media content. In some implementations, certain steps of method 500 can be combined, performed simultaneously or in a different order, without deviating from the objective of method 500 or without producing different results. Method 500 begins at a step 510.

In step 510, a request is initiated from a console for a specific content package. In one implementation, the requested content package includes a unique ID, such as for example, a data structure having a multi-bit word that is associated with a license offer, which also has a unique ID. The request can be initiated at any time that a console is enabled for operation. Generally, the request can be initiated by a user through a user interface. In some implementations, the request can be initiated from a game controller, a joystick, a console interface, or an application that is executing on a processor, and may require input from a keyboard or a pointing device.

In a step 520, it is determined whether the specific content package requested in step 510 is available locally, and if not, the specific content package is downloaded from an appropriate source in a step 530. In one implementation, the determination includes checking a local content registry of the console or computing device requesting the specific content package, for one or more registry entries corresponding to the specific content package, identifying each registry entry and then returning an indicator for each identified registry entry that indicates that a content package is available locally. Then, in a step 540, the content package, sourced locally or downloaded, is opened.

In a step 550, it is determined whether the integrity of the package is preserved. In one implementation, the determination is based on a one-way hash of the content package. In this implementation, the content package includes a digest file produced by a one way hash of the content that is appended to the content package for later verification. In another implementation, the determination can be based on a multiple hash of the content package or other verification methods, as will be appreciated by the skilled practitioner. In the above implementations, the content package can be verified by processing the content (e.g., application, digital component, etc.) of the content package using the same hash process used to produce the digest file and then comparing the result with the appended digest. If any difference exists between the appended digest file and the hash of the content, then the content package is determined to be compromised. If the integrity of the content package is determined to be compromised, the content package is deleted in a step 555, and method 500 returns to step 530 to download an authenticated version of the specific content package to replace the deleted content package. An authenticated specific content package can, for example, be a content package from a verified trusted source, or a content package that is signed with an authenticating digital signature. The integrity of a content package can be compromised, for example, due to inadvertent loss of one or more bits in the transmission of the specific content package, or because a third party has changed some aspect of the specific content package, or attempted to substitute a different content package or digest. Thus, any change of even a single bit in the content of the specific content package, from when it was provided by the content provider and when it was received by the party requesting it be downloaded, represents a compromise in the integrity of the specific content package. In another implementation, step 550 may be considered optional in some potential applications, and if so, is omitted, so that step 540 proceeds directly to a step 560. Otherwise, step 550 proceeds to step 560.

In step 560, a use license is obtained for digital content contained within the specific content package. In one implementation, the use license is obtained by sending a request for the use license from a console (e.g., 100A) or a computing device to a console service (e.g., console service 410). In another implementation, the license request includes a unique computing system ID and at least one unique user ID. A use-license package associated with the computing system ID, the user ID and one or more license offers for the requested content package can then be received from the console service. In one implementation, each distinct license offer for a specific content package is identified with a unique license offer ID. In one variation, the use-license package is embodied in a private key signed data structure that includes a unique digest associated with the specific content package and also includes a plurality of data records corresponding to one or more digital content access permissions.

In step 570, one or more use-license parameters are determined for the obtained use-license package. In one implementation, the use-license parameters are determined by first opening the use-license package. The use-license package can include a record of permissions for each of the one or more license offers. In some implementations, the one or more license offers are each associated with the user ID, based on for example, a record of a purchase of an offer by a user associated with the user ID.

Upon opening the license package, a determination is made whether the use-license type is restricted or unlimited, and in response to a determination that the use license is restricted, one or more permissions for each license offer are determined. Finally, a record of permissions for the specific content package is generated based on an aggregation of permissions from each of the one or more offers associated with the user ID.

In a step 580, use of the digital content is enabled in accord with the determined license parameters. In one implementation, the license parameters are stored at a non-volatile memory location that can be accessed when the digital content is invoked. The use of the digital content according to the license parameters can be enabled at any time after the license parameters are determined. In one implementation, use of the digital content is enabled on a per-session basis, so that changes in license parameters between subsequent accesses of the content can be applied. In some implementations, the digital content is a digital game component or an executable gaming application, for example. In another implementation, the digital content is an instruction set for expanding a gaming application, e.g., a module that provides additional functionality or adds another component to the gaming application when it is executed. In yet another implementation, the digital content is a media file, such as music, video, or other digital media content.

Another embodiment of method 500 can include additional steps, such as determining whether more than one user ID is associated with the computing system ID. When the determination indicates that more than one user ID is associated with the computing system ID (such as when multiple players are or can log onto the same console), the record of permissions for each user ID (e.g., each such player) associated with the content package ID (e.g., game ID) can then be compared. If the license rights so provide, a multi-user permission record can then be generated based on an aggregation of the record of permissions to the digital content for each user ID associated with the computing system ID.

By way of example, the following scenarios illustrate how varying license permissions for multiple users and media consoles can be implemented. The following illustrations are not exhaustive, and therefore do not reflect every possible application or possible implementation of the embodiments described above, but are merely included to aid a skilled practitioner in understanding various disclosed features.

In certain implementations, a license package can have a series of permission bits that can toggle game play modes such as "demonstration mode," "standard play mode," and "unlimited ammunition mode." Correspondingly, each license mode that is purchased enables a game to be played on the first console that it is downloaded with no user restriction (i.e., other console users can access the game), and the purchasing user can download and play the game on another console where the user is logged on. The following scenario illustrates the utility of the described license features. A first user "A" purchases "demonstration mode" for a game (i.e., for no cost) and downloads a license to a first console "X" as the first machine with which the content is used. A second user "B" purchases "standard play mode" for the game and downloads a license to a second console "Y" as the first machine with which the content is used. A third user "C" purchases "unlimited ammunition" and downloads a license to console "Z" as the first console with which the content is used.

In a first example, user "C" now desires to play a game on console "X" and can download the game if it is not already available on the console. A license package is provided to console "X" for user "C" that includes permission bits toggled for "demonstration mode" and "unlimited ammo." The permission bits are logically OR'd together for user "C" and machine "X," granting user "C" "unlimited ammunition" in "demonstration mode" for the game played on console "C." However, since console "X" is the second machine on which user "C" has used the license after purchase, only user "C" is granted a license for "unlimited ammunition," rather than all users of console "X," and the "unlimited ammunition mode" will expire when user "C" logs off console "X."

In another example, user "B" now desired to play the game on console "X." When user "B" logs on the console, the license package provided by the console service toggles the "demonstration mode" and the "standard play mode" permission bits for user "B." Again the user and console permission bits are logically OR'd together, granting "standard play mode" for user "B" on console "X," since user "B" purchased a license for standard mode play and the license is portable for user "B." However, other users (such as user "A") of console "X" may not have "standard mode play" for the game on console "X," unless they also purchase a "standard play mode" license.

In yet another example, user A plays the game on console "Z." The license package provided by the console service includes permission bits toggled for "unlimited ammunition mode" and "demonstration mode." The permission bits are again logically OR'd together for user "A" and machine "Z," granting user "A" "unlimited ammunition" in "demonstration mode" for the game play on console "Z".

Finally, user A plays the game on console "Y." The license package provided by the console service includes permission bits toggled for "unlimited ammunition mode" and "standard play mode." The permission bits are logically OR'd together for user "A" and console "Y," granting user A "unlimited ammunition" in "demonstration mode" for the game play on console "Y".

Figure 6:
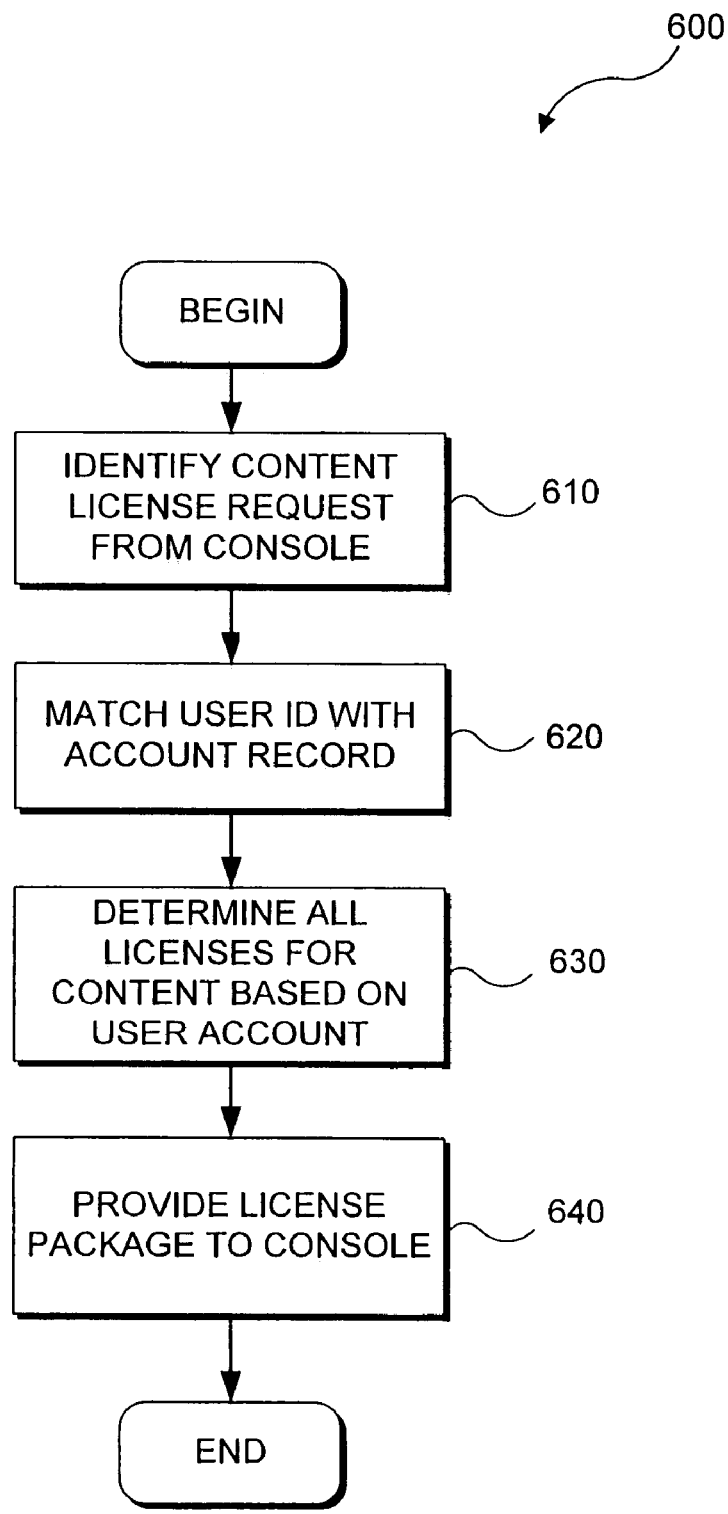
FIG. 6 is a flow diagram illustrating the steps of another exemplary method.

FIG. 6 is a flow diagram illustrating another exemplary method 600. Method 600 can be implemented in some embodiments with components, devices and techniques as discussed with reference to FIGS. 1-4. In some implementations, one or more steps of method 600 are embodied on a computer readable medium containing computer readable code such that a series of steps are implemented when the computer readable code is executed on a computing device, such as a microprocessor. In the following description, various steps of the method 600 are described with respect to one or more console service processors performing the method steps. In some implementations, certain steps of method 600 can be combined, and performed simultaneously or in a different order, without deviating from the objective of method 600 or without producing different results. Method 600 begins at a step 610.

In a step 610, a license request for a content package originating from a console or a computing system is identified. In some implementations, the request includes a computing system ID, a content package ID, and a user ID. Generally, each ID is unique, such as a numeric or alphanumeric code or digital serial number that distinguishes one content package, computing system, and user from another. The license request can be identified at any time that a console service is configured for receiving such requests.

In a step 620, the user ID is matched with a user account record in response to identifying the request. The user account record includes a primary computing system ID associated with the user ID and a transaction history. In one implementation, the transaction history includes a record of content license offers for the content package that are licensed for use with the user ID. In some implementations, the license offer also includes a unique license offer ID.

In a step 630, all available licenses for the content package are determined based on the user account record. In some implementations, the available licenses are determined by first identifying each license offer associated with the content package ID included in the user account record and then accessing a content offer database to determine each additional license offer (if any) that are associated with the content package ID, but not included in the user account record. Finally, a combined license offer record is generated that enumerates each content access-permission granted by the combination of license offers thus identified. In one implementation, the permissions of the license offer record are incorporated into a license package, along with a digest of the content for which the license is granted. In another implementation, the license package that incorporates the license offer parameters can also be signed with an encrypted code, such as a private key that is usable with a public key infrastructure.

In a step 640, a license package is provided to the computing system. In some implementations, the license package includes content access permissions based on the user account record. In one implementation, the user account associated with the license package is updated with a record of the license package permissions sent to the console or other computing system. The license package can be provided to the console or other computing system upon demand, or at a later time, by processing a queue of license packages waiting to be provided to each such requestor.

Another implementation of method 600 includes first receiving a request for a content package from the console or other computing system. In one implementation, the request includes the computing system ID, the user ID and the content package ID, each a unique indicator as described above. Next, the requested content package is provided to the computing system subject to the user account record that is associated with the user ID. In one implementation, the license package is embodied in a data structure, (e.g., a 16, 32, 64, 128, etc. bit word), having a plurality of binary flags corresponding to the one or more content access permissions. In another implementation, the license pack is embodied in a private key signed data structure that includes a unique digest associated with the specific content package and a plurality of data records corresponding to one or more digital content access permissions. In general, the content package can be sent at any time after a request for a content package is received by a console service. In one implementation, the requested content package is provided by first determining whether the requesting console or other computing system matches a record of the primary computing system ID, and then sending the content package to the requesting console or other computing system when the computing system ID is identical to the primary computing system ID.

In another implementation, the requested content package is provided by determining whether the user account record includes a license to provide the content package to the console or other computing system, when the computing system ID is not identical to the primary computing system ID. The content package is then sent to the console or other computing system when the user account record includes such a license.

In yet another implementation, the content package is sent to the console or other computing system by first determining the content package ID based on the content package request. The content package is then retrieved from a content package repository based on the content package ID. The retrieved content package ID is next associated with the user account record. Finally, the content package is conveyed to the computing system via a communication system.

Exemplary Dialog Screens

Figure 7:
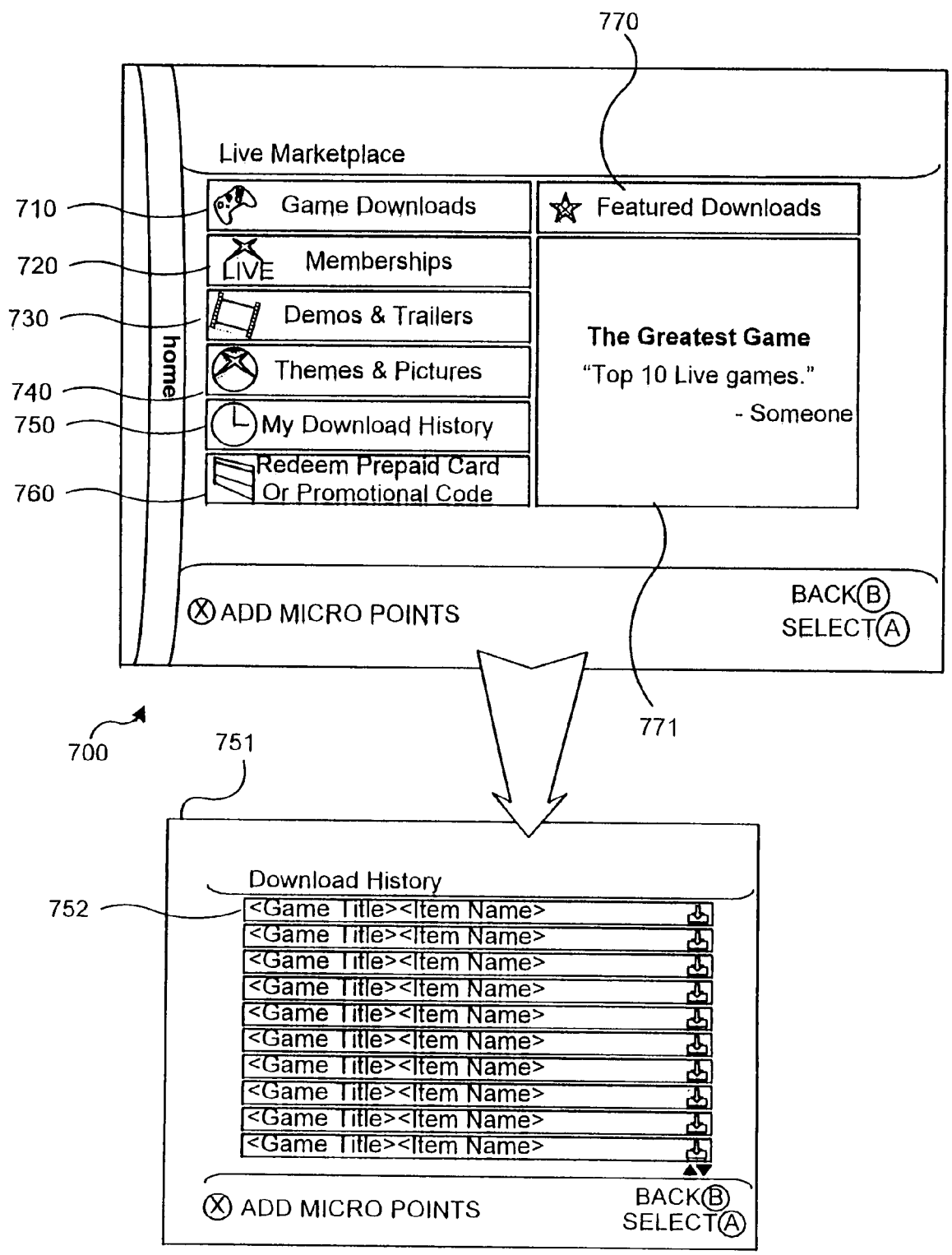
FIG. 7 is a schematic diagram of an exemplary graphical user interface dialog screen.
Figure 8:
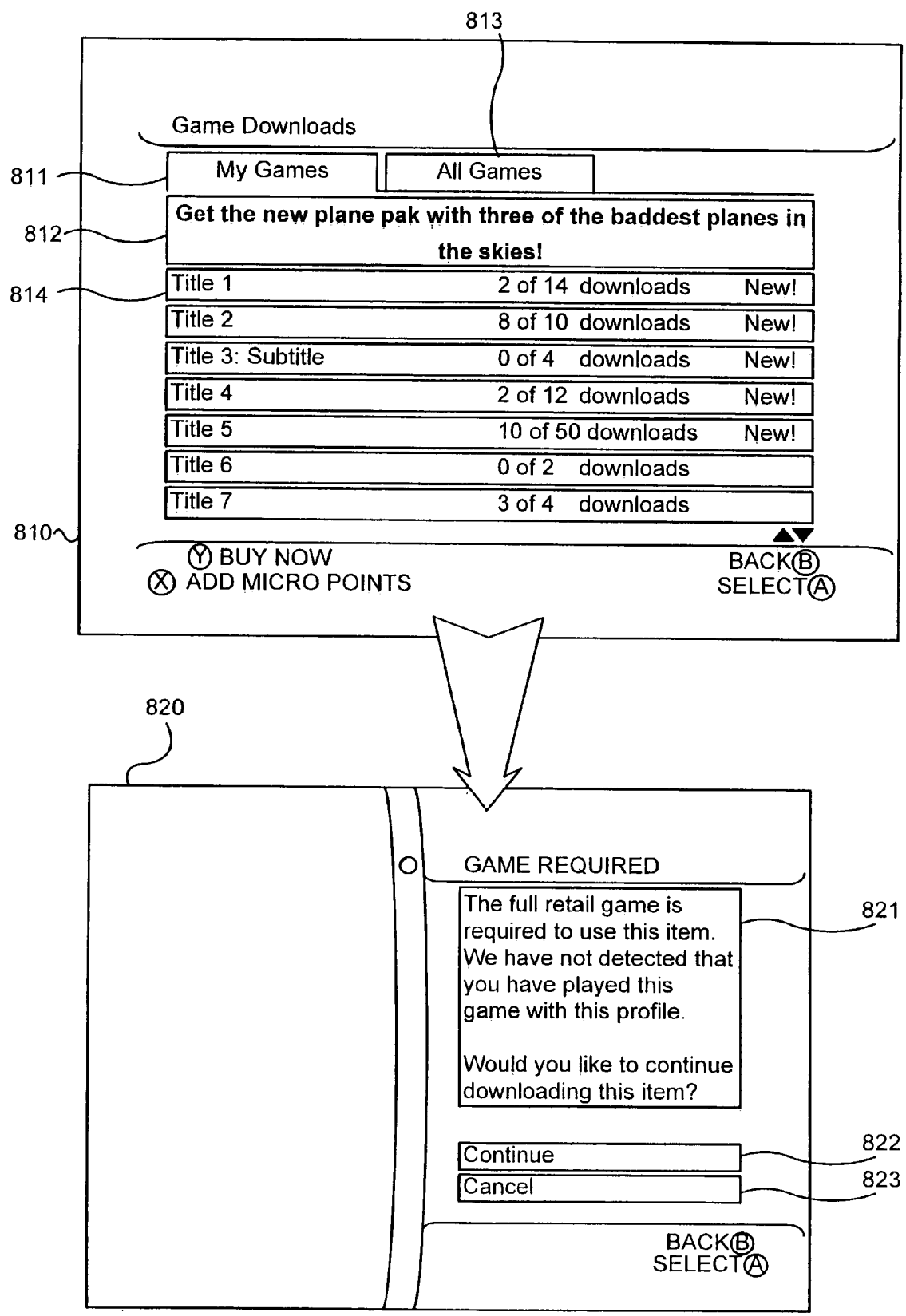
FIG. 8 is a schematic diagram of another exemplary graphical user interface dialog screen.
Figure 9:
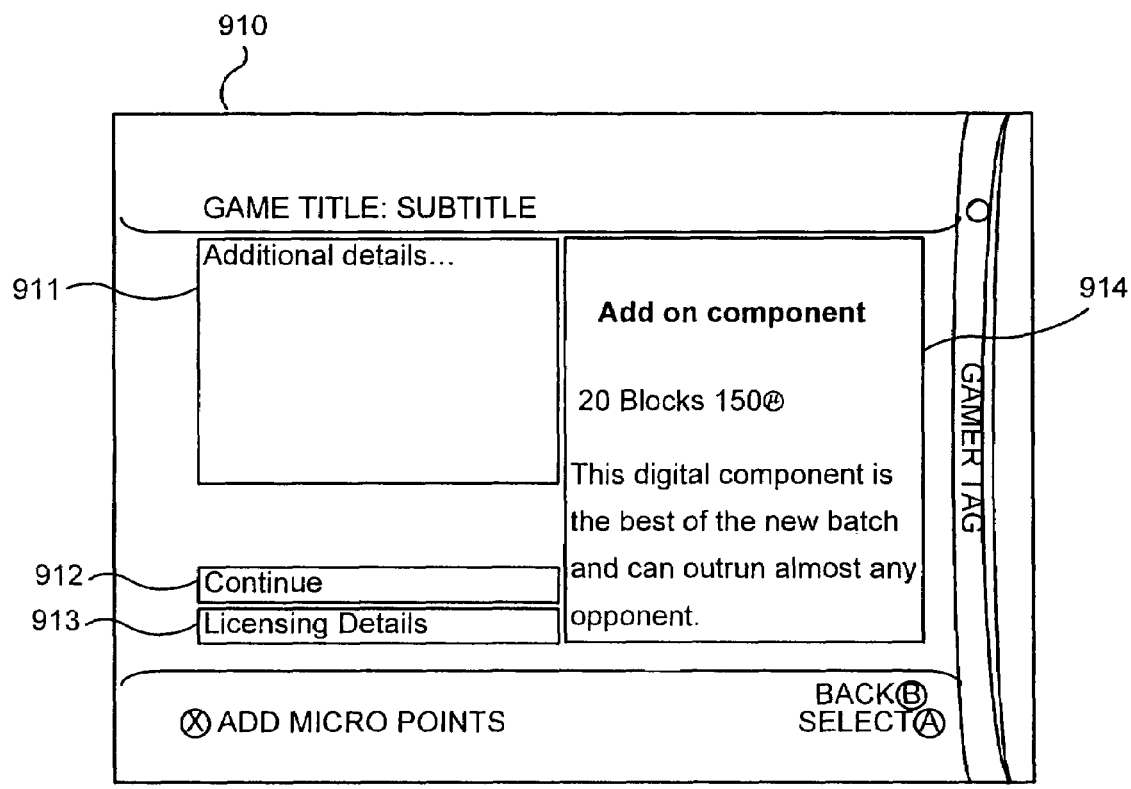
FIG. 9 is a schematic diagram of yet another exemplary graphical user interface dialog screen.

FIGS. 7-9 graphically illustrate, through exemplary dialog screens, some interactions of the system, components and methods described in reference to FIGS. 1-6. The following description and corresponding Figures are meant only to server as illustrative dialog screens that aid in understanding certain functionality, but are in no way intended to represent all possible combinations of dialog screens or of possible uses of the described system and methods.

FIG. 7 illustrates an exemplary main dialog screen 700. The main dialog screen illustrates menu options from which a user can select using a user input device at a console or other computing device. Main depicted dialog screen 700 includes selections for "Game Downloads" 710, "Memberships" 720, "Demos & Trailer" 730, "Themes & Pictures" 740, "My Download History" 750, and "Redeem Prepaid Card or Promotional Code" 760, as well as enabling the user to navigate to other dialog screens and other selections. A "Featured Download" 770 portion of main dialog screen 700 can be used for promotional items, such as games, that are advertised in a graphical window 771. Generally, a menu item can be invoked by selecting the field of the desired menu selection. Dialog screen 751 of FIG. 7 represents a screen that can be presented in response to a user invoking the "My Download History" menu item in main dialog screen 700. As illustrated in FIG. 7, dialog screen 751 can include information associated with a user account, such as any digital content, e.g., games 752 that have previously been downloaded by the user associated with a specific user ID for that account.

By way of further illustration, FIG. 8 is a schematic diagram of another exemplary graphical user interface dialog screen 810, which represents a screen that can be presented in response to a user invoking the "Game Downloads" menu item 710 in main dialog screen 700 (FIG. 7). Dialog screen 810 includes tab selections, including a "My Games" tab 811 and an "All Games" tab 813, and can include promotional items 812 for games and game components. "My Games" tab 811 provides a list of content titles 814 for previously purchased content, along with identifying information about the content, including the amount of related content that has been downloaded and whether new content has become available that relates to the content title.

As a further illustration of the relationship of content to available downloads, an exemplary dialog screen 820 is presented to a user when content is invoked that is not yet downloaded. A dialog message 821 can indicate that additional components, or even a full program, need to be downloaded in order to proceed with the content invocation. As illustrated in FIG. 8, dialog screen 820 can present a selection 822 to continue downloading content, and a selection 823 to cancel a content download.

By way of another illustration, FIG. 9 illustrates an exemplary dialog screen 910 that can be presented to a user for prompting the user to obtain a digital game component. Dialog screen 910 includes details describing a game title 911 and a description of a component with an offer for acquiring a digital component 914. A user can invoke an acquisition of the digital component with a "Continue" field 912, or obtain additional information about the license rights that a user obtains with the digital component with a "Licensing Details" field 913.

Each of the above-described dialog screens illustrated in FIGS. 7-9 can be employed with the components of the exemplary operating environment illustrated in FIG. 4, in order to facilitate the methods described with reference to FIGS. 5 and 6. In particular, the illustrative dialog screens can be displayed to a user by a console as described in FIGS. 1 and 2, in order to enable user interaction with a console service, such as that illustrated in FIG. 4.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for managing portable content license rights for digital content usable with a plurality of computing systems, comprising:
   (a) obtaining a plurality of portable use licenses by a plurality of users wherein each portable use license comprises license parameters for digital content, each of the plurality of users having a corresponding user identifier, and each user identifier corresponding to a different one of the plurality of portable use licenses, wherein each of the portable use licenses comprises license parameters for the digital content that are specific to each corresponding user identifier;
   (b) receiving by a remote computing system a request for a specific content package comprising the digital content;
   (c) downloading the specific content package to a local computer;
   (d) logging on to the local computer by at least two of the plurality of users by inputting at least two of the user identifiers into the local computer;
   (e) transmitting the at least two user identifiers from the local computer to the remote computing system;
   (f) determining by the remote computing system at least two portable use licenses and transmitting from the remote computing system to the local computer the at least two portable use licenses corresponding to the at least two user identifiers;
   (g) receiving the at least two portable use licenses at the local computer and determining license parameters specific to each of the at least two user identifiers from the portable use licenses;
   (h) accessing together by the at least two users, the digital content at the local computer, wherein each of the two users accesses the digital content using the determined license parameters that is specific to each corresponding user identifier;
   (i) logging off of the local computer by at least one of the two users; and
   (j) based on the logging off of the at least one user, deleting the corresponding portable use license at the local computer and preventing access to the digital content at the local computer with the deleted portable use license until the at least one user logs back on.

2. The method of claim 1, wherein the request for a specific content package is initiated in connection with one of:
   (a) a game controller;
   (b) a joystick;
   (c) a console interface;
   (d) a software application that is executing; and
   (e) a keyboard.

3. The method of claim 1, wherein obtaining the plurality of portable use licenses a comprises:
   (a) requesting the plurality of portable use licenses by including a unique computing system identifier and at least one unique user identifier for each portable use license; and
   (b) receiving the at least two portable use licenses, wherein each portable use license is associated with the corresponding computing system identifier, the corresponding user identifier, and is available with one or more license offers directed to the specific content package and that is identified with a unique license offer identifier.

4. The method of claim 3, wherein each portable use license is embodied in a data structure signed by an owner of a private key, wherein the data structure includes a unique digest associated with the portable use license and a plurality of data records corresponding to one or more digital content access permissions.

5. The method of claim 4, wherein the method further comprises:
   (a) opening each portable use license, wherein each portable use license includes a record of permissions for each of the one or more license offers and wherein the one or more license offers are each associated with a corresponding user identifier;
   (b) determining whether each portable use license is restricted or unlimited;
   (c) determining one or more permissions for each license offer; and
   (d) generating a record of permissions for the specific content package based on an aggregation of permissions from each of the one or more offers associated with each corresponding user identifier.

6. The method of claim 5, and further comprising:
   (a) determining whether more than one user identifier is associated with the computing system identifier;
   (b) comparing the record of permissions for each user identifier associated with the content package identifier, responsive to a determination that more than one user identifier is associated with the computing system identifier; and (c) generating a multi-user permission record for the digital content associated with the computing system identifier, the multi-user permission record being based on an aggregation of the record of permissions associated with each such user identifier.

7. The method of claim 5, wherein the permissions limit the use to at least one of:
   (a) a single user identifier;
   (b) a single computing system identifier;
   (c) a predefined number of times that the digital content can be used;
   (d) a predefined period of time during which the digital content can be used;
   (e) a predefined number of computing system identifiers;
   (f) an unlimited number of computing system identifiers;
   (g) a predefined number of user identifiers;
   (h) an unlimited number of user identifiers; and
   (i) a predefined number of times that the digital content can be duplicated.

8. The method of claim 1, wherein the digital content comprises at least one of:
   (a) a digital game software component;
   (b) an executable gaming application;
   (c) an instruction set for expanding a gaming application; and
   (d) a media file.

9. A memory medium on which are stored machine instructions for carrying out the steps of claim 1.

* * * * *

UNITED STATES PATENT AND TRADEMARK OFFICE
CERTIFICATE OF CORRECTION

| | | |
|---|---|---|
| PATENT NO. | : 7,337,147 B2 | Page 1 of 1 |
| APPLICATION NO. | : 11/172227 | |
| DATED | : February 26, 2008 | |
| INVENTOR(S) | : Ling Tony Chen et al. | |

It is certified that error appears in the above-identified patent and that said Letters Patent is hereby corrected as shown below:

In column 16, line 26, in Claim 3, after "licenses" delete "a".

Signed and Sealed this

Fifteenth Day of February, 2011

David J. Kappos
*Director of the United States Patent and Trademark Office*